United States Patent [19]
Lauton

[11] Patent Number: 4,830,632
[45] Date of Patent: May 16, 1989

[54] AQUEOUS COMPOSITION FROM A SULFONATED PHENOL, AN AMINE AND A TANNING SALT, PROCESS FOR THE PRODUCTION THEREOF AND USE THEREOF AS A TANNING AGENT

[75] Inventor: Alain Lauton, Saint-Louis, France

[73] Assignee: Ciba-Geigy Corporation, Ardsley, N.Y.

[21] Appl. No.: 42,770

[22] Filed: Apr. 27, 1987

[30] Foreign Application Priority Data

May 5, 1986 [CH] Switzerland ........................ 1825/86

[51] Int. Cl.$^4$ .......................... C14C 3/08; C08G 8/04; C08G 14/02

[52] U.S. Cl. ...................................... 8/94.33; 8/94.25; 8/94.28; 8/94.29; 528/129

[58] Field of Search ...................... 528/129; 8/94.19 R, 8/94.25, 94.26, 94.27, 94.28, 94.33, 94.29

[56] References Cited

U.S. PATENT DOCUMENTS 4,247,293 1/1981 Wurmli ............................... 8/94.24

FOREIGN PATENT DOCUMENTS 0683084 11/1952 United Kingdom .

OTHER PUBLICATIONS

Kuntzel, A., Gerbereichemisches Taschenbuch, Steinkopff Verlag (1955).

*Primary Examiner*—A. Lionel Clingman
*Assistant Examiner*—John F. McNally
*Attorney, Agent, or Firm*—Edward McC. Roberts

[57] ABSTRACT

Aqueous compositions derived from (A) a reaction product of a phenol and e.g. oleum in a molar ratio (phenol):($SO_3$) being (1):(1.1–2.2), (B) a water soluble, lower alkylamine or lower alkanolamine, a lower alkylenediamine, a poly-dialkylenepolyamine having 3 to 5 N-atoms or a heterocyclic amine, (C) a water soluble chromium, aluminium, iron or zirconium tanning salt or mixtures thereof and optionally, (D) an alkali metal salt of ethylenediaminetetraacetic acid or of a pyrophosphate are prepared by admixing an aqueous solution of component (A) and optionally (D) first with component (B) and subsequently with component (C) which may optionally be present in the form of an aqueous solution and are used as tanning agent for tanning pelts or retanning all types of leather.

15 Claims, No Drawings

AQUEOUS COMPOSITION FROM A SULFONATED PHENOL, AN AMINE AND A TANNING SALT, PROCESS FOR THE PRODUCTION THEREOF AND USE THEREOF AS A TANNING AGENT

The present invention relates to an aqueous composition which is characterized in that it contains (A) a reaction product of a phenol and a sulfonating agent, the molar ratio of (phenol):($SO_3$) being (1):(1.1-2.2), (B) a water soluble, primary, secondary or tertiary $C_1$-$C_4$-alkylamine, $C_2$—$C_3$-alkanolamine or $C_2$-$C_6$ alkylenediamine, a poly-$C_2$-$C_3$-alkylenepolyamine having 3 to 5 nitrogen atoms or a heterocyclic amine, (C) a water soluble chromium, aluminium, iron or zirconium tanning salt or mixtures thereof and optionally, (D) an alkali metal salt of ethylenediaminetetraacetic acid or of a pyrophosphate.

The present invention also relates to a process for the production and to the use thereof as tanning agent of the above composition.

The preferred sulfonating agent for component (A) of the composition according to the present invention is $SO_3$ or in particular oleum. Component (A) is thus preferably a reaction product of phenol and oleum, wherein the molar ratio (phenol):($SO_3$) is preferably (1):(1.4-1.8).

Component (A) is known per se. Thus for example in British Patent Specification No. 683 084, there is described the preparation of reaction products from phenol and oleum which are, however, further reacted for example with formaldehyde and urea or thiourea and also used as tanning agents. The component (A) used according to the present invention is a mixture of polyhydroxy-polyphenylsulfone sulfonic acids which presumably contains as a major component a 3,3'-dihydroxydiphenylsulfone disulfonic acid.

Preferred primary, secondary or tertiary $C_1$-$C_4$-alkylamines, $C_2$-$C_3$-alkanolamines or $C_2$-$C_6$-alkylenediamines for use as component (B) are in particular mono-, di- or tri-ethanolamine, dimethylethanolamine, ethylenediamine and N-hydroxyethylethylenediamine; preferred poly-$C_2$-$C_3$-alkylenepolyamines having 3 to 5 nitrogen atoms are N,N-dimethylpropylenediamine, pentamethylenediamine, hexamethylenediamine, triethylenetetraamine and tetraethylenepentamine and preferred heterocyclic amines are especially morpholine as obtained for example from diethanolamine and sulphuric acid. Diethanolamine is of particular interest here.

Tanning agents which are ready for use and which are suitable for use as component (C) are described in the relevant technical literature. These are usually chromium, aluminum, iron or zirconium salts. Examples of such salts are basic chromium (III) chloride or sulphate, a chrome alum, optionally basic aluminium chloride or sulphate, an alum, iron (III) chloride or sulphate, zirconium oxychloride or optionally basic zirconium sulphate. Mixtures of the above-mentioned chromium and aluminium salts are furthermore suitable for use as component (C). Preferred compounds include $[CrCl_2(OH_2)_4]Cl.2\ H_2O$, $[Cr(OH_2)_6]Cl_3$, $Cr(OH)SO_4$, $Cr_2(OH)_4SO_4$, $KCr(SO_4)_2.12\ H_2O$, $AlCl_3.6\ H_2O$, $Al_2(SO_4)_3.16\ H_2O$, $Al_2(OH)_4SO_4$, $Al(OH)_2Cl$, $Al(OH)Cl_2$, $KAl(SO_4)_2.12\ H_2O$, $Fe_2(SO_4)_3.9\ H_2O$, $Zr(OH)_2SO_4$, $ZrOCl_2.8\ H_2O$ and $Zr(SO_4)_2.4\ H_2O$.

The basic chromium sulphates $Cr(OH)SO_4$ and $Cr_2(OH)_4SO_4$ which are obtainable from chromium alum and an alkali in an equivalents ratio of 3:1 to 3:2 are of primary interest here [see for example Gerbereichemisches Taschenbuch (Chemical tanning handbook) by A. Küntzel, Steinkopff Verlag, 1955].

Insofar as the optional component (D) is concurrently use in the composition according to the present invention, tetrasodium ethylenediamintetraacetate or neutral or acid sodium pyrophosphate ($Na_4P_2O_7$ or $Na_2H_2P_2O_7$) may suitably be employed. The optional component (D) acts as a complexing agent and is preferably added to the composition if iron-free tanning agents are used and if the iron content in the oleum used in the preparation of component (A) is relatively high.

Usually not more than 0.2 parts by weight of component (B) per part by weight of component (A) are used in the composition.

Since the tanning salts of the type under consideration as component (C) have widely differing molecular weights in the weight ratio of component (A) to component (C), the weights of component (C) are preferably based on the metal atom of the corresponding tanning salt. In addition when using chromium tanning salts as component (C), not more than 0.375 parts of chromium may be used per part of component (A). Larger amounts of chromium would not be soluble in the composition and would lead to non-homogeneous compositions. Preferred compositions thus contain the components (A) and (C) in a weight ratio of (A):(C) of (1):(0.03 to 0.5) based on the metal atom of the component (C), such that not morer than 0.375 parts of chromium are present. Compositions which have the highest possible tanning salt content are preferred, as the component (C) tanning salts are cheaper than the component (A) reaction product of phenol and oleum whereby the tanning activity of the composition being based on component (A) as well as on component (C). Compositions in which the components (A) and (C) are present in a weight ratio of (A):(C) of (1):(0.3 to 0.375) are thus particularly preferred.

Where the optional component (D) is also used, the use of 0.04 parts by weight of component (D) per part by weight of component (A) is sufficient to achieve the complexing activity of the component (D). The compositions thus normally contain the components (A) and (D) in a weight ratio of (A):(D) of (1):(0 to 0.04).

A composition according to the present invention diluted with water to 1%, based on the solids content of components (A), (B), (C) and optionally (D), has a pH of not more than 5. The 1% aqueous solutions of compositions according to the present invention containing the components (A) and (B) in a preferred weight ratio of (A):(B) of (1):(0.05 to 0.18) have a pH in the range of from 0 to 3.5.

In general the compositions according to the present invention have a water content of 40 to 80, preferably of 45 to 62 percent by weight.

The preparation of the composition according to the present invention generally comprises first mixing an aqueous solution of the component (A) and, optionally, component (D) with component (B) and subsequently with component (C), which may also be in the form of an aqueous solution. Before mixing with the component (B), and optionally with the component (D), the component (A) should for safety reasons be first diluted with water to give 50 to 70 percent by weight solutions of component (A). In this case, component (B) on its own or in admixture with the optional component (D) is slowly added to the aqueous solution of component (A), so that the admixture of the component (A) and, optionally, component (D) takes place with the component (B) in an aqueous medium under moderate external cooling, preferably from 60° to 90° C.

Only as a final step in the component (C) added to the mixture of components (A), (B) and optionally (D). In this connection the component (D) may be added in solid form with intensive stirring.

This is especially the case when using for example aluminium tanning salts as component (C). With the use of chromium tanning salts it has, however, proved particularly advantageous to use component (C) as an aqueous solution, in which case the aqueous solution of component (C) is usually heated to 60° to 90° C. before admixture with the components (A), (B) and optionally (D). After the admixture of all components, the composition is in general diluted with water to the preferred water content of from 40 to 80 percent by weight.

The so obtained compositions according to the present invention are fluid and are especially suitable for the tanning of pelts or for the retanning of all types of leather.

The tanning process employed is a conventional one whereby pelts or pre-tanned leather are treated with an aqueous solution containing an aqueous composition according to the present invention and the so tanned material is subsequently finished in conventional manner for example by neutralization, rinsing, stuffing and drying. If desired, a dyeing process may be carried out. Usually 100 to 200, preferably 140 to 180 parts by weight of water and 5 to 40 parts by weight of an aqueous composition according to the present invention are used per 100 parts by weight of pelts or leather.

In particular 100 parts by weight of preferably delimed pelts are tanned with 140 to 160 parts by weight of water and 10 to 20 parts by weight of the composition according to the present invention or 100 parts by weight of conventionally chrome tanned leather which has been neutralized for example with formate or bicarbonate, is post-tanned with 140 to 160 parts by weight of water and 5 to 15 parts by weight of the composition according to the present invention. The tanned material is rinsed and optionally finally fatliquored with a conventional fatliquoring agent based on for example sulfonated fish oil, sperm oil or neat's food oil. After drying, there is obtained a light, briliant leather with good light fastness properties and a firm, compact, smooth grain and a soft handle.

Apart from the good properties of the tanned material, mentioned above, the composition of the present invention also has the important advantage that, owing to the presence of component (B), it is particularly stable during storage. Even after storage for many months no turbidity or flocculation can be observed in the composition.

All percentages and parts given in the following Instruction and in the following Preparatory Examples are by weight.

Process for the preparation of component (A)

Instruction A:

136.5 parts of phenol (1.45 mol) are fused at 45° C. 193.4 parts of 20% oleum (1.08 mol $SO_3$) are slowly added to this melt so that the temperature of the reaction mixture does not rise about 160° C. The reaction mixture is then stirred under reduced pressure at 20 Torr and at 160° C. for six hours, during which time the water formed in the reaction together with small amounts of molten phenol are removed azeotropically from the reaction mixture. Finally the reaction mixture is cooled under normal pressure to 40° C., to give 253 parts of a molten mixture of polyhydroxy-polyphenylsulfonesulfonic acids containing the disulfonic acid of formula

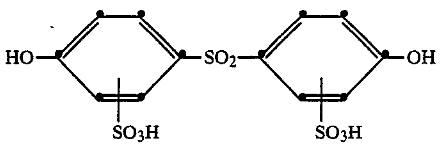

(1)

as the main component.

Preparatory Examples

Example 1

To a solution of 166.5 parts of the reaction product of phenol and oleum prepared according to Instruction A, 100 parts of water and 4 parts of tetrasodium ethylenediaminetetraacetate are added slowly to 15 parts of diethanolamine so that the temperature of the reaction mixture does not rise above 70° C. The reaction mixture is held at 70° C. for 15 minutes with stirring to give a clear solution. To the reaction silution is then added a solution of 198 parts of $Cr(OH)SO_4$ (corresponding to 62.3 parts of chromium) in 360.5 parts of water preheated to 70° C. The reaction solution is then held at 70° C. for 20 minutes with stirring, diluted with 156 parts of water and cooled to 20° C. 1,000 parts of a composition are obtained containing 166.5 parts of the reaction product of phenol and oleum, 15 parts of diethanolamine, 198 parts of $Cr(OH)SO_4$ (corresponding to 62.3 parts of chromium), 4 parts of tetrasodium ethylenediaminetetraacetate and 616.5 parts of water. After storage for 3 months the composition is still homogenous, that is to say it shows no turbidity or flocculation. A 1% solution of this composition has a pH of 2.9.

Example 2

To a solution of 166.5 parts of the reaction product of phenol and oleum (molar ratio; phenol:$SO_3$, 1:1.43) prepared according to Instruction A, 150 parts of water and 4 parts of tetrasodium ethylenediaminetetraacetate, are slowly added 10 parts of diethanolamine such that the temperature of the reaction mixture does not rise above 70° C. The reaction mixture is held at 70° C. for 15 minutes with stirring, whereupon a clear solution is obtained. To this reaction solution is added a filtered solution preheated to 70° C. of 139 parts of $Cr(OH)SO_4$ (corresponding to 43.8 parts of chromium) and 45.78 parts of $Al_2(OH)_4SO_4$ (corresponding to 11.3 parts of aluminium) in 484.72 parts of water. The reaction solution is then stirred for 20 minutes at 70° C. and subsequently cooled to 20° C. 1,000 parts of a storage stable composition are obtained. A 1% solution of this composition has a pH of 3.

A composition which is also storage stable is obtained by using 3 parts of trisodium phosphate or 7.5 parts of N,N'-dimethylpropanediamine in place of 4 parts of tetrasodium ethylenediaminetetraacetate and the 10 parts of diethanolamine.

Examples 3 to 8

The procedure described in Example 2 is repeated, using a filtered solution, preheated to 70° C., containing the parts of tanning salts and water given below in place of 45.78 parts of $Al_2(OH)_4SO_4$ and 484.72 parts of water:

| Example | Parts of tanning salt | parts of water |
|---|---|---|
| 3 | 98.6 $AlCl_3.6H_2O$* | 431,9 |
| 4 | 130 $Al_2(SO_4)_3.16H_2O$* | 400.5 |
| 5 | 40.3 $Al(OH)_2Cl$* | 490.2 |
| 6 | 47 $Al(OH)Cl_2$* | 483.5 |
| 7 | 195 $KAl(SO_4)_2.12H_2O$* | 335.5 |
| 8 | 76 $Fe_2(SO_4)_3.9H_2O$** | 458.5 |

*corresponding to 11.03 parts of aluminium
**corresponding to 15 parts of iron to give solutions which have comparably good storage stability.

Example 9

To a solution of 116 parts of the reaction product of phenol and oleum (molar ratio; phenol:$SO_3$, 1:1.43) prepared according to Instruction A, 120 parts of water and 4 parts of tetrasodium ethylenediaminetetraacetate there are slowly added 15 parts of diethanolamine or 8.5 parts of N-(2-hydroxyethyl)-ethylenediamine so that the temperature of the reaction mixture does not rise above 70° C. The reaction mixture is stirred at 70° C. for 15 minutes, whereupon a clear solution is obtained. To this reaction solution is added a filtered solution, prewarmed to 70° C., of 145.46 parts of $Cr(OH)SO_4$ (corresponding to 45.82 parts of chromium) and 65.36 parts of $Zr(OH)_2SO_4$ (corresponding to 26.82 parts of zirconium) in 493 parts of water. The reaction solution is subsequently maintained at 70° C. for 20 minutes with stirring and then cooled to 20° C. 1000 parts of a storage stable composition are obtained. A 1% solution of this composition has a pH of 2.4.

Compositions having good storage properties are also obtained by using 95.0 parts of $ZrOCl_2.8\ H_2O$ or 106 parts of $Zr(SO_4)_2.4\ H_2O$ (all corresponding to 26.82 parts of zirconium) instead of 65.36 parts of $Zr(OH)_2SO_4$.

Example 10

To a solution of 150 parts of the reaction product of phenol and oleum (molar ratio; phenol:$SO_3$, 1:2.2) prepared according to Instruction A there are slowly added 100 parts of water and 30 parts of diethanolamine, or 10.5 parts of triethylenetetramine, such that the temperature of the reaction mixture does not rise above 70° C. The reaction mixture is held at 70° C. for 15 minutes with stirring, whereupon a clear solution is obtained. A filtered solution of 238.36 parts of $Cr(OH)SO_4$ (corresponding to 75.09 parts of chromium) in 450 parts of water warmed to 90° C. is added to this reaction solution. The reaction solution is subsequently stirred for 20 minutes at 90° C. and then diluted with 1120 parts of water and cooled to 20° C. A storage stable composition is obtained. A 1% solution of this composition has a pH of 2.1.

Example 11

To a solution of 150 parts of the reaction product of phenol and oleum (molar ratio; phenol:$SO_3$, 1:1.35) 100 parts of water and 6 parts of tetrasodium ethylenediaminetetraacetate, prepared according to Instruction A, there are slowly added 7.5 parts of diethanolamine such that the reaction temperature does not rise above 70° C. The reaction mixture is stirred for 15 minutes at 70° C. to give a clear solution. To this reaction solution is added a filtered solution preheated to 90° C. of 14.3 parts of $Cr(OH)SO_4$ (corresponding to 4.5 parts of chromium) in 50 parts of water. The reaction solution is subsequently stirred for 20 minutes at 60° C. and then diluted with 156 parts of water and cooled to 20° C. There is obtained a composition which is storage stable. A 1% solution of this composition has a pH of 1.05.

Compositions having comparably good storage properties are obtained by using in the above Example (a) 23.06 parts of $[CrCl_2(OH_2)_4]Cl.2\ H_2O$, 11.68 parts of $Cr_2(OH)_4SO_4$ or 43.5 parts of $KCr(SO_4)_2.12\ H_2O$ in place of the 14.3 parts of $Cr(OH)SO_4$;

(b) 5 parts of sodium pyrophosphate or disodium pyrophosphate in place of 6 parts of tetrasodium ethylenediaminetetraacetate and (c) 12.7 parts of dimethylethanolamine, 1.5 parts of ethylenediamine, 2.5 parts of N-(2-hydroxyethyl)-ethanolamine, 3 parts of N,N-dimethylpropanediamine, 2 parts of pentamethylenediamine, 2.2 parts of hexamethylenediamine or 6.2 parts of morpholine in place of 7.5 parts of diethanolamine.

Example 12

100 parts of delimed calf hides are treated with 150 parts of water and 15 parts of the composition prepared according to Example 1 for 24 hours at 20° C. in a revolving drum. After neutralization, washing, fatliquoring, racking, drying, conditioning, staking and oiling there is obtained a tanned, lightly opaque leather with a full grain and a soft handle.

Example 13 to 16

The procedure according to Example 12 is repeated, using per 100 parts of calf hides the following amounts of composition:

| Parts of composition | according to Example |
|---|---|
| 18 | 2 |
| 18 | 9 |
| 12 | 10 |
| 65 | 11 |

to give a leather having similar properties to that of Example 12.

Example 17

100 parts of shaved chrome-tanned calf leather are treated with 150 parts of water and 10 parts of the composition prepared according to Example 1 for two hours in a revolving drum at 50° C. After rinsing, the leather is neutralized in a conventional manner with sodium formate and sodium bicarbonate, washed, dyed with one part of the leather dyeing agent C.I. Acid Brown 189 and after-treated with a conventional fatliquoring agent based on sulfonated fish oil. After finishing the leather as described in Example 12, there is obtained a tanned, brown, brilliant leather having a full grain and a soft handle.

Example 18 to 21

The process of Example 17 is repeated, using the following amounts of composition per 100 parts of shaved chrome-grained calf leather:

| parts of composition | according to Example |
|---|---|
| 16,5 | 2 |
| 16,5 | 9 |
| 8 | 10 |
| 40 | 11 |

to give a leather having similar properties to that of Example 17.

What is claimed is:

1. An aqueous storage stable composition which comprises (A) a reaction product of a phenol and a sulfonating agent, with the molar ratio of phenol:$SO_3$ being 1:1.1–2.2, (B) a water soluble, primary, secondary or tertiary $C_1$–$C_4$-alkylamine, $C_2$—$C_3$-alkanolamine or $C_2$–$C_6$-alkylenediamine, a poly-$C_2$–$C_3$-alkylenepolyamine having 3 to 5 nitrogen atoms or a heterocyclic amine, (C) a water soluble chromium, aluminium, iron or zirconium tanning salt or mixtures thereof and optionally, (D) an alkali metal salt of ethylenediaminetetraacetic acid or of a pyrophosphate, and 40 to 80 percent by weight of water, the composition comprising per part by weight of component (A) not more than 0.2 parts by weight of component (B), 0.03 to 0.5 parts by weight of component (C) and 0 to 0.04 parts by weight of component (D).

2. A composition according to claim 1, wherein component (A) is a reaction product of phenol and oleum, with the molar ratio of phenol:$SO_3$ being 1:1.4 to 1.8.

3. A composition according to claim 1, wherein component (B) is mono-, di or tri-ethanolamine, dimethylethanolamine, ethylenediamine, N-hydroxyethylethylenediamine, N,N-dimethylpropylenediamine, pentamethylenediamine, hexamethylenediamine, triethylenetetramine, tetraethylenepentamine or morpholine.

4. A composition according to claim 1, wherein component (C) is basic chromium (III)-chloride or -sulphate, a chromium alum, optionally basic aluminium chloride or sulphate, an alum, iron (III)-chloride or -sulphate, zirconium oxychloride or optionally basic zirconium sulphate or mixtures of the above mentioned chromium and aluminium salts.

5. A composition according to claim 4, wherein component (C) is $[CrCl_2(OH_2)_4]Cl.2\ H_2O$, $[Cr(OH_2)_6]Cl_3$, $Cr(OH)SO_4$, $Cr_2(OH)_4SO_4$, $KCr(SO_4)_2.12\ H_2O$, $AlCl_3.6\ H_2O$, $Al_2(SO_4)_3.16\ H_2O$, $Al_2(OH)_4SO_4$, $Al(OH)_2Cl$, $Al(OH)Cl_2$, $KAl(SO_4)_2.12\ H_2O$, $Fe_2(SO_4)_3.9\ H_2O$, $Zr(OH)_2SO_4$, $ZrOCl_2.8\ H_2O$ or $Zr(SO_4)_2.4\ H_2O$.

6. A composition according to claim 1, wherein the optional component (D) is tetrasodium ethylenediaminetetraacetate or neutral or acid sodium pyrophosphate.

7. A composition according to claim 1, which, as 1% aqueous solution, based on the solids content of components (A), (B), (C) and, optionally (D), has a pH of not more than 5.

8. A composition according to claim 1, which contains components (A) and (B) in a weight ratio of (A):(B) of 1:0.05 to 0.18.

9. A composition according to claim 8, which, as 1% aqueous solution, based on the solids content of components (A), (B), (C) and, optionally (D), has a pH of from 0 to 3.5.

10. A composition according to claim 9, which contains components (A) and (C) in a weight ratio of (A):(C) of 1:0.3 to 0.375.

11. A composition according to claim 1, which has a water content of 40 to 80 percent by weight.

12. A process for the preparation of a composition according to claim 1, which comprises first mixing an aqueous solution of component (A) and, optionally component (D), with component (B) and subsequently with the component (C), which may optionally be present as an aqueous solution.

13. A process according to claim 12, wherein the admixture of the component (A) and, optionally, of component (D) with component (B) is carried out in an aqueous medium with cooling at from 60° to 90° C.

14. A process according to claim 12, wherein an aqueous solution of component (C) is warmed to 60° to 90° C. before admixture with components (A), (B) and, optionally, with the component (D).

15. A process for tanning pelts or for retanning leather, comprising the step of treating the pelts or the leather with an aqueous composition which comprises (A) a reaction product of a phenol and a sulfonating agent, with the molar ratio of phenol:$SO_3$ being 1:1.1–2.2, (B) a water soluble, primary, secondary or tertiary $C_1$–$C_4$-alkylamine, $C_2$–$C_3$-alkanolamine or $C_2$–$C_6$-alkylenediamine, a poly-$C_2$–$C_3$-alkylenepolyamine having 3 to 5 nitrogen atoms or a heterocyclic amine, (C) a water soluble chromium, aluminium, iron or zirconium tanning salt or mixtures thereof and optionally, (D) an alkali metal salt of ethylenediaminetetraacetic acid or of a pyrophosphate, and 40 to 80 percent by weight of water, the composition comprising per part by weight of component (A) not more than 0.2 parts by weight of component (B), 0.03 to 0.5 parts by weight of component (C) and 0 to 0.04 parts by weight of component (D).

* * * * *